US012572681B2

(12) United States Patent (10) Patent No.: US 12,572,681 B2
Wen et al. (45) Date of Patent: Mar. 10, 2026

(54) MASKING SENSITIVE INFORMATION IN RAW DATA

(71) Applicant: INTERNATIONAL BUSINESS MACHINES CORPORATION, Armonk, NY (US)

(72) Inventors: Bo Wen, Chappaqua, NY (US); Tin Kam Ho, Millburn, NJ (US); Jeffrey L. Rogers, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 18/583,628

(22) Filed: Feb. 21, 2024

(65) Prior Publication Data

US 2025/0265361 A1 Aug. 21, 2025

(51) Int. Cl.
*G06F 21/62* (2013.01)
*H04L 9/40* (2022.01)

(52) U.S. Cl.
CPC .......... *G06F 21/6218* (2013.01); *H04L 63/08* (2013.01); *H04L 63/105* (2013.01)

(58) Field of Classification Search
CPC .... G06F 21/6218; H04L 63/08; H04L 63/105
USPC .......................................................... 726/4
See application file for complete search history.

(56) References Cited

U.S. PATENT DOCUMENTS 9,904,798 B2 2/2018 Avrahami et al.
10,114,960 B1 * 10/2018 McClintock ........ H04L 63/1408

10,223,548 B2 3/2019 Bilodeau et al.
10,255,202 B2 * 4/2019 Khosravi ............ G06F 12/1408
11,182,414 B2 11/2021 Bandyopadhyay et al.
11,636,269 B2 4/2023 Chopra et al.
11,699,432 B2 7/2023 Bender et al.
11,790,889 B2 10/2023 Musoles et al.
11,949,681 B2 * 4/2024 Lu ........................ H04L 63/0807
2013/0218911 A1 * 8/2013 Li ............................ G06F 16/21
                                                      707/E17.069
2014/0343371 A1 * 11/2014 Sowers, II ........... A61B 5/1455
                                                      600/323
2015/0324609 A1 * 11/2015 Grubel .................. H04L 63/105
                                                      726/26

(Continued)

OTHER PUBLICATIONS

"Dell EMC PowerProtect Cyber Recovery Solution, Configuring and Hardening the CR Vault Data Domain System," Dell Technologies Solutions, Configuration Guide H18480.1, May 2021, 31 pg.

(Continued)

*Primary Examiner* — Tauqir Hussain
(74) *Attorney, Agent, or Firm* — Harrity & Harrity, LLP

(57) ABSTRACT

Obfuscated data comprising a plurality of alternative representations of raw data can be generated. At least one user, or at least one group of users, can be assigned to portions of the alternative representations of the raw data. Responsive to a user authenticating with a credential manager, a permission level of the user of the user can be determined. Responsive to the user submitting a data request, whether the data request requests raw data the user is not authorized to access can be determined. Responsive to determining that the data request requests raw data the user is not authorized to access, at least a portion of the obfuscated data the user is authorized to access can be presented to the user. The portion of the obfuscated data can include at least one plurality of alternative representations of the raw data.

20 Claims, 3 Drawing Sheets

300

GENERATE OBFUSCATED DATA COMPRISING A PLURALITY OF ALTERNATIVE REPRESENTATIONS OF RAW DATA, WHEREIN THE RAW DATA IS STORED IN A SECURE DATA VAULT
302

ASSIGN AT LEAST ONE USER, OR AT LEAST ONE GROUP OF USERS, TO EACH OF AT LEAST A PORTION OF THE PLURALITY OF ALTERNATIVE REPRESENTATIONS OF THE RAW DATA
304

RESPONSIVE TO A USER AUTHENTICATING WITH A CREDENTIAL MANAGER, DETERMINE A PERMISSION LEVEL OF THE USER
306

RESPONSIVE TO THE USER SUBMITTING A DATA REQUEST, DETERMINE WHETHER THE DATA REQUEST REQUESTS RAW DATA THE USER IS NOT AUTHORIZED TO ACCESS
308

RESPONSIVE TO DETERMINING THAT THE DATA REQUEST REQUESTS RAW DATA THE USER IS NOT AUTHORIZED TO ACCESS, PRESENT TO THE USER AT LEAST A PORTION OF THE OBFUSCATED DATA THE USER IS AUTHORIZED TO ACCESS, THE PORTION OF THE OBFUSCATED DATA COMPRISING AT LEAST ONE PLURALITY OF ALTERNATIVE REPRESENTATIONS OF THE RAW DATA
310

(56) References Cited

U.S. PATENT DOCUMENTS

| | | | |
|---|---|---|---|
| 2016/0144358 A1* | 5/2016 | Patel | G16H 10/40 |
| | | | 435/287.1 |
| 2016/0259807 A1* | 9/2016 | Factor | G06F 9/00 |
| 2017/0128003 A1* | 5/2017 | Lim | G16H 20/70 |
| 2019/0272386 A1* | 9/2019 | Ley | G06F 21/6245 |
| 2019/0328320 A1* | 10/2019 | Lim | A61B 5/4818 |
| 2021/0157923 A1* | 5/2021 | Mallya | G06F 21/6218 |

OTHER PUBLICATIONS

"Access / Permissions Based on Demonstrated Skill," IP.Com Prior Art Database, Technical Disclosure No. IPCOM000237131D, Jun. 4, 2014, 3 pg.

"Arbitrary Question Formation for Access Challenge in Multi-Factor based Authentication Mechanism," IP.Com Prior Art Database, Technical Disclosure No. IPCOM000260504D, Nov. 2019. 30, 4 pg.

"A Factoid QA Agency for an Indificual Expert," IP. Com Prior Art Database, Technical Disclosure No. IPCOM000267343D, Oct. 2021. 19, 4 pg.

Sil, A. et al., "PrimeQA: The Prime Repository for State-of-the-Art Multilingual Question Answering Research and Development," arXiv Preprint, arXiv:2301.09715v2, Jan. 2023. 25, 11 pg.

"ServiceNow Vault Data Sheet," [online] Service. Now, Inc. © 2022, SN-DataSheet_Name_01012022, retrieved from the Internet: <https://www.servicenow.com/content/dam/servicenow-assets/public/en-us/doc-type/resource-center/data-sheet/ds-vault.pdf>, 2 pg.

"Veeva SiteVault Free, Technical and Operational Security," [online] Veeva Systems © Copyright 2024, retrieved from the Internet: <https://sites.veeva.com/resources/veeva-sitevault-technical-and-operational-security-whitepaper/>, 17 pg.

Specht-Riemenschneider, L., "Data access rights—A comparative perspective," In Data Access, Consumer Interests and Public Welfare, Mar. 2021, pp. 401-438, Nomos Verlagsgesellschaft mbH & Co. KG, 38 pg.

Mell, P. et al., The NIST Definition of Cloud Computing, National Institute of Standards and Technology, U.S. Dept. of Commerce, Special Publication 800-145, Sep. 2011, 7 pg.

* cited by examiner

100

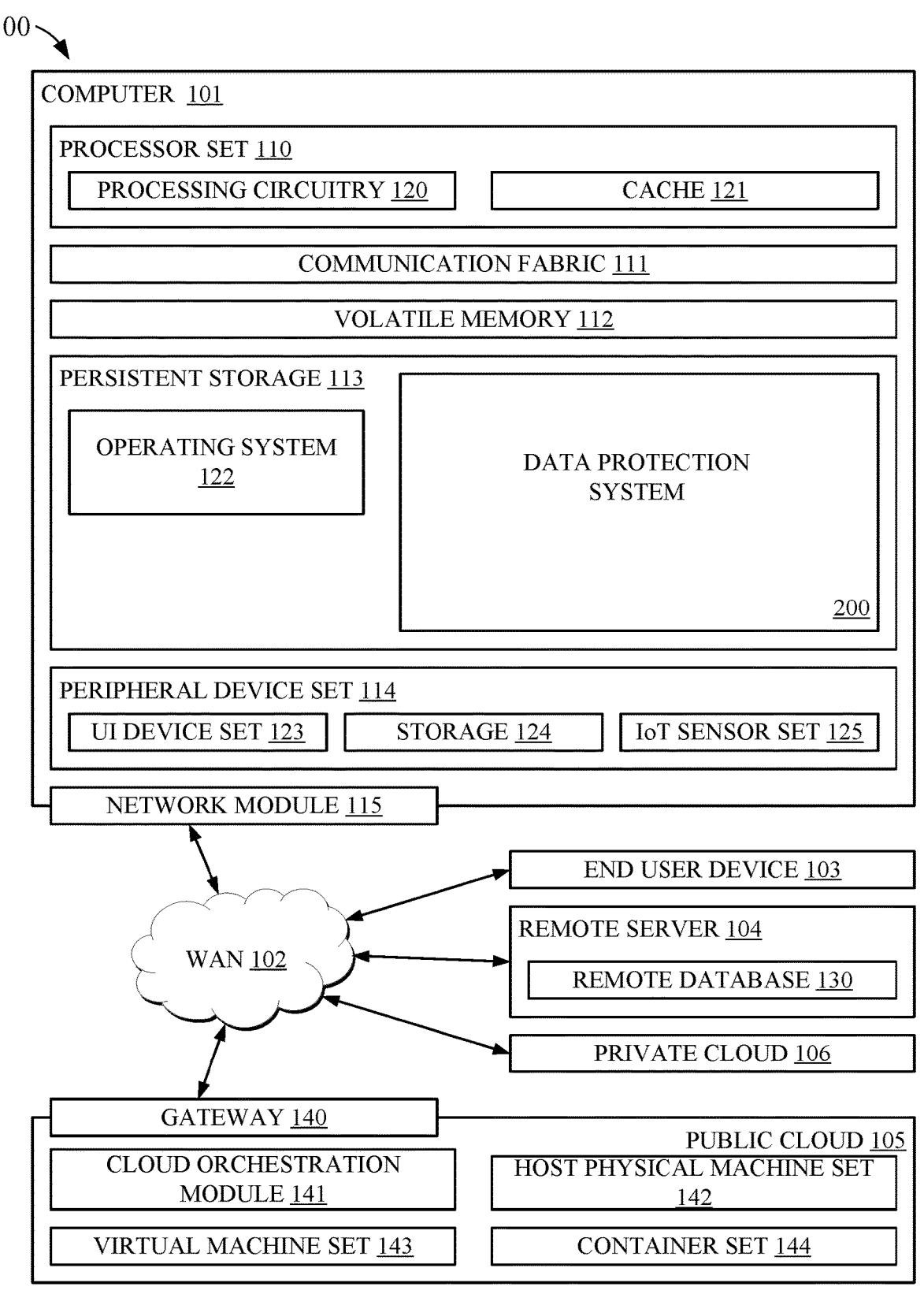

COMPUTER 101

PROCESSOR SET 110

PROCESSING CIRCUITRY 120     CACHE 121

COMMUNICATION FABRIC 111

VOLATILE MEMORY 112

PERSISTENT STORAGE 113

OPERATING SYSTEM
122

DATA PROTECTION
SYSTEM

200

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION
MODULE 141

HOST PHYSICAL MACHINE SET
142

VIRTUAL MACHINE SET 143     CONTAINER SET 144

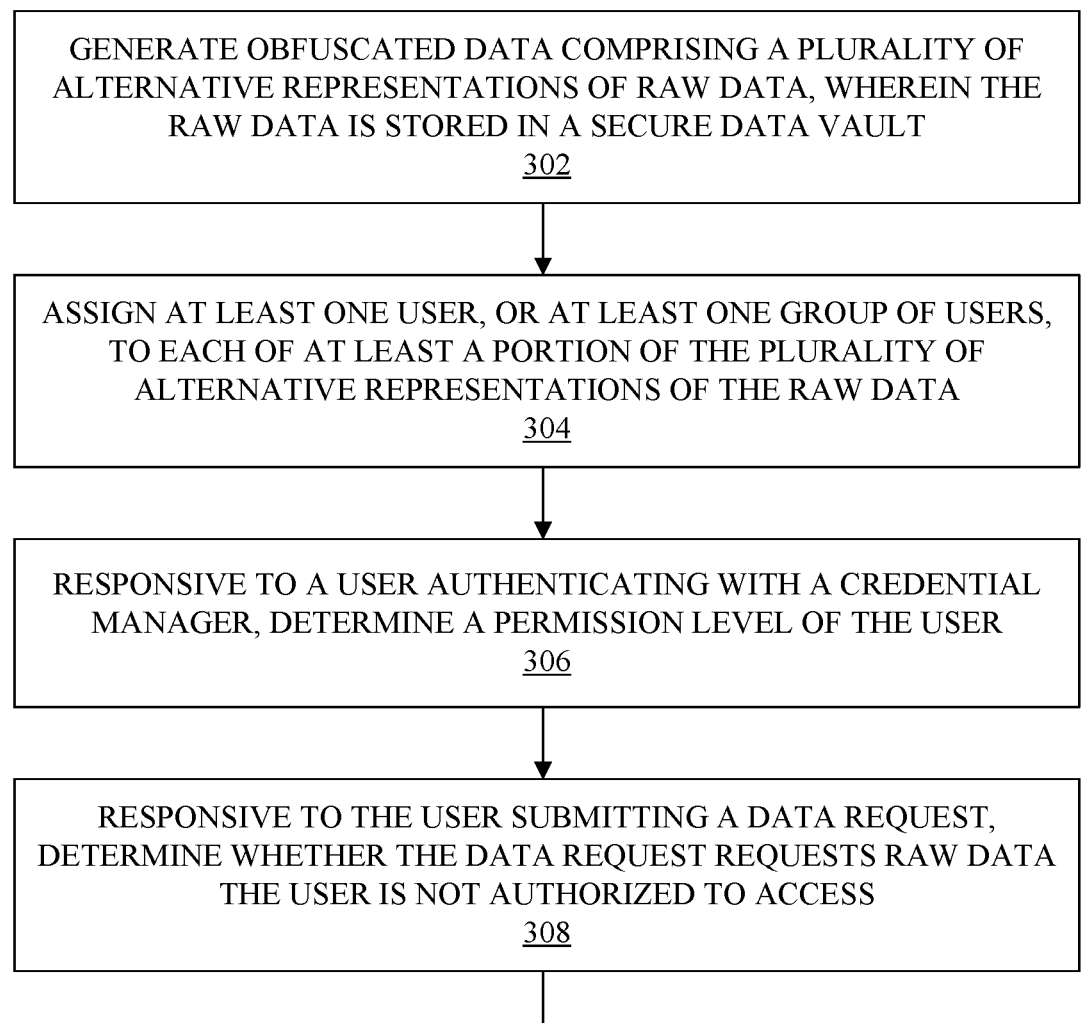

GENERATE OBFUSCATED DATA COMPRISING A PLURALITY OF ALTERNATIVE REPRESENTATIONS OF RAW DATA, WHEREIN THE RAW DATA IS STORED IN A SECURE DATA VAULT
302

ASSIGN AT LEAST ONE USER, OR AT LEAST ONE GROUP OF USERS, TO EACH OF AT LEAST A PORTION OF THE PLURALITY OF ALTERNATIVE REPRESENTATIONS OF THE RAW DATA
304

RESPONSIVE TO A USER AUTHENTICATING WITH A CREDENTIAL MANAGER, DETERMINE A PERMISSION LEVEL OF THE USER
306

RESPONSIVE TO THE USER SUBMITTING A DATA REQUEST, DETERMINE WHETHER THE DATA REQUEST REQUESTS RAW DATA THE USER IS NOT AUTHORIZED TO ACCESS
308

RESPONSIVE TO DETERMINING THAT THE DATA REQUEST REQUESTS RAW DATA THE USER IS NOT AUTHORIZED TO ACCESS, PRESENT TO THE USER AT LEAST A PORTION OF THE OBFUSCATED DATA THE USER IS AUTHORIZED TO ACCESS, THE PORTION OF THE OBFUSCATED DATA COMPRISING AT LEAST ONE PLURALITY OF ALTERNATIVE REPRESENTATIONS OF THE RAW DATA
310

FIG. 3

MASKING SENSITIVE INFORMATION IN RAW DATA

BACKGROUND

The present invention relates to data processing systems, and more specifically, to digital health data systems.

The Health Insurance Portability and Accountability Act (HIPAA) is a U.S. federal law requiring the creation of national standards to protect sensitive patient information from being disclosed without the patient's consent or knowledge. To implement HIPAA, the U.S. Department of Health and Human Services ("HHS") issued the Standards for Privacy of Individually Identifiable Health Information, known as the "Privacy Rule," which establishes a set of national standards for the protection of certain health information. The Privacy Rule standards address, among other things, the use and disclosure of individuals' health information, called "protected health information," by organizations subject to the Privacy Rule.

SUMMARY

A method includes generating, using a processor, obfuscated data including a plurality of alternative representations of raw data, wherein the raw data is stored in a secure data vault. The method also can include assigning at least one user, or at least one group of users, to each of at least a portion of the plurality of alternative representations of the raw data. The method also can include, responsive to a user authenticating with a credential manager, determining a permission level of the user. The method also can include, responsive to the user submitting a data request, determining whether the data request requests raw data the user is not authorized to access. The method also can include, responsive to determining that the data request requests raw data the user is not authorized to access, presenting to the user at least a portion of the obfuscated data the user is authorized to access, the portion of the obfuscated data including at least one plurality of alternative representations of the raw data.

A system includes a processor programmed to initiate executable operations. The executable operations can implement the above method.

A computer program product includes a computer readable storage medium having program code stored thereon. The program code is executable by a data processing system to initiate operations. The operations can implement the above method.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 1 depicts a cloud computing environment according to an embodiment of the present invention.

FIG. 3 is a flowchart illustrating an example of a method of masking sensitive information in raw data.

DETAILED DESCRIPTION

Figure 2:
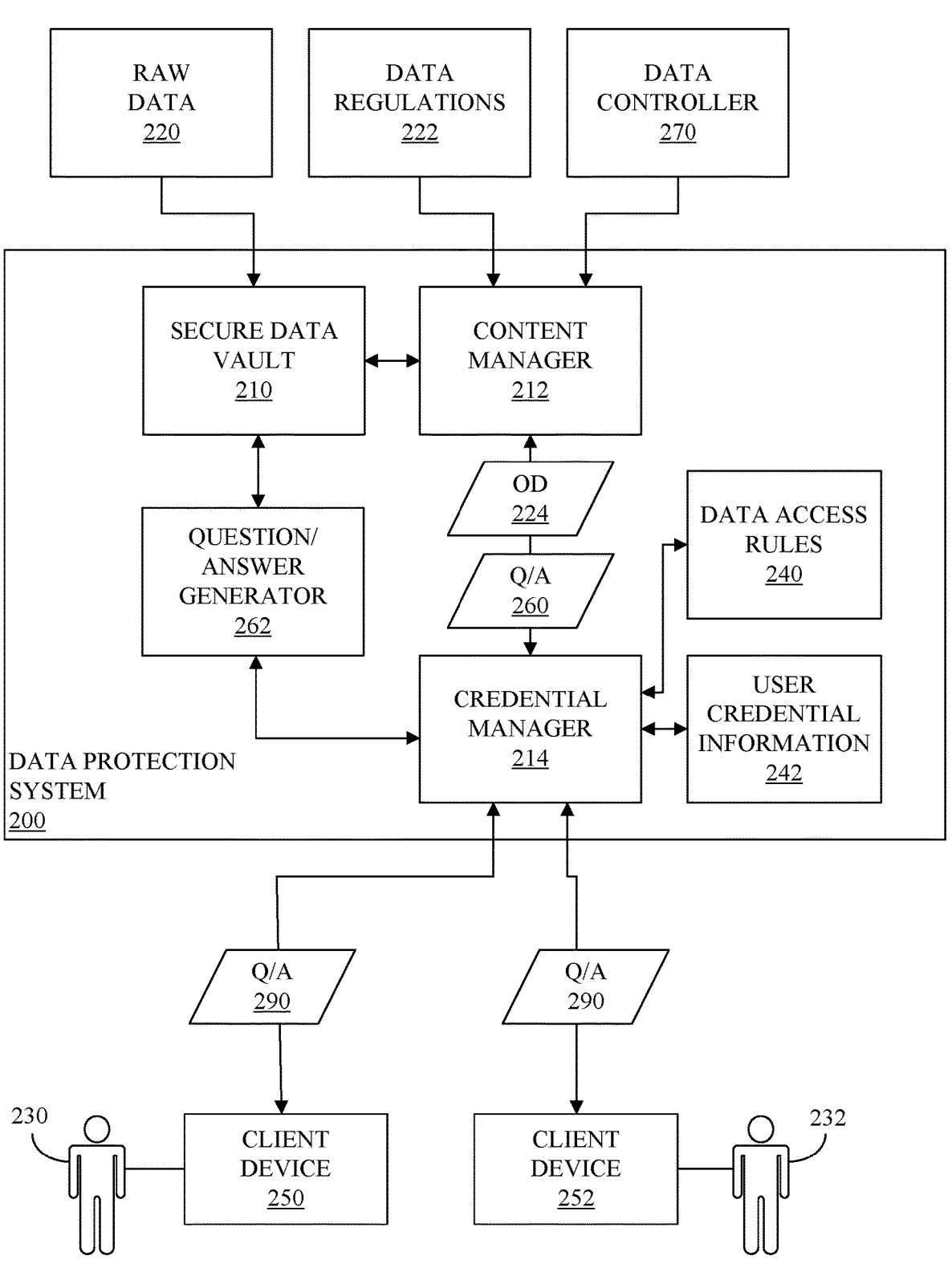
FIG. 2 is a block diagram illustrating example architecture for a data protection system according to an embodiment of the present invention.

The arrangements described herein are directed to computer technology, and provide an improvement to computer technology. Specifically, the present arrangements improve accessibility to, and use of, protected health information while complying with the HHS Privacy Rule. In this regard, the present arrangements can process protected health information to glean insights into that information without disclosing private health information. Those insights can be used for research, for example medical research and disease epidemiology. Thus, the inventive arrangements described herein are a practical application of processing protected health information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as data protection system 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 is a block diagram illustrating example architecture for a data protection system 300 according to an embodiment of the present invention. Data protection system 200 can include a secure data vault 210, a content manager 212 and a credential manager 214.

Secure data vault 210 can include, for example, one or more secured databases. Secure data vault 210 can receive, and store, raw data 220 provided by various data sources. Raw data 220 can include both structured and unstructured (e.g., text) data. For example, raw data 220 can include health information for numerous people. The health information can be provided by hospitals, clinics, healthcare providers, etc. The health information can include data pertaining to medical afflictions, medical treatments, patient demographic information, etc. The raw data 220 also can include context information pertaining to the healthcare data. In illustration, the context information can include information pertaining to travel by people afflicted with an infectious disease, information pertaining to social contacts by people afflicted with infectious diseases prior to, and after, onset of medical symptoms pertaining to infectious diseases, etc.

Content manager 212 can be configured to not only filter raw data 220 accessed from secure data vault 210, but also to obfuscate such raw data 220, thereby protecting patient confidentiality.

Content manager 212 can access and store data regulations 222 pertinent to raw data 220, and implement various rules for processing raw data 220 in accordance with data regulations 222. In illustration, content manager 212 can access and store Standards for Privacy of Individually Identifiable Health Information, known as the "Privacy Rule," issued by the U.S. Department of Health and Human Services ("HHS"). Content manager 212 can implement processes (e.g., procedures and/or protocols) to ensure that data protection system 200 complies with the Privacy Rule.

Such processes can include generating obfuscated data 224 by performing data obfuscation. Data obfuscation can include, for example, content manager 212 determining alternative data representations of raw data 220, and in obfuscated data 224 replacing raw data 220 with the alternative data representations. The alternative data representations of raw data 220 can include synthetic values and/or synthetic parameters that are analogous to, but different than, values and/or parameters contained in raw data 220.

Content manager 212 can generate one or more sets of obfuscated data 224 for one or more sets of raw data 220. Content manager 212 can assign user access rights to sets of obfuscated data 224 based on user roles and/or user data access authorizations for various users 230, 232, various groups of users 230, 232, etc. Further, content manager 212 can assign access rights to sets of raw data 220 based on user roles and/or user data access authorizations for various users 230, 232, various groups of users 230, 232, etc.

Content manager 212 can be configured to present obfuscated data 224 using various types of alternative data representations. For each type of alternative data representation, content manager 212 can use data access rules 240 to specify access rights to the alternative data representations for various specific users 230, 232, various groups of users 230, 230, etc. based on user roles and/or user data authorization levels assigned to users 230, 232. Data access rules 240 can be a component of data protection system 200 that specifies rules and/or user data access authorizations for specific users 230, 232, various groups of users 230, 230, etc.

Users 230, 232 can interact with credential manager 214 via their respective client devices 250, 252 to access such data. In illustration, using their client devices 250, 252 one or more users 230, 232 can log into, and authenticate with, credential manager 214. During the login process, users 230, 230 can provide to credential manager 214 their user authentication information, for example user names, passwords, etc. Credential manager 214 can access user credential information 242. Based on user credential information 242 for each user 230, 232, credential manager 214 can validate respective users 230, 232 and determine their respective assigned roles and/or data access authorization levels. Credential manager 214 can access data access rules 240 and, based on data access rules 240, determine which data users 230, 232 can access, including raw data 220 and/or obfuscated data 224, based on their assigned roles and/or data access authorization levels.

Content manager 212 can implement processes that include question and answer pairs (Q/A) 260 pertaining to raw data 220. For example, content manager 212 can include, or otherwise access, a question/answer generator 262. In illustration, content manager 212 can identify sensitive attributes (e.g., sensitive values and/or sensitive parameters) in raw data 220. For each sensitive attribute in raw data 220, content manager 212 can initiate question/answer generator 262 to create a set of questions, and pair those questions with corresponding answers. The questions can be pertain to one or more attributes or facts included in the raw data. The questions can be similarly-oriented questions. A similarly-oriented question is a question similar in scope to a request for raw data 220, but configured to request data, including obfuscated data 224, which at least some users are authorized to access. The answers can be derived from values in the sensitive attributes. Content manager 212 can generate each Q/A 260 to include at least one question and at least one answer to that question. The questions that are created can involve other attributes that are not sensitive. Questions in Q/A 260 can be made to be selectively available to users 230, 232, seeking to receive insights into raw data 220, based on their respective user roles (e.g., user credentials).

In one or more non-limiting arrangements, content manager 212 can initiate question/answer generator 262 to generate Q/A 260 pertaining to raw data 220 in response to raw data 220 being received by secure data vault 210. In one or more non-limiting arrangements, content manager 212 can initiate question/answer generator 262 to generate, in real time, Q/A 260 pertaining to raw data 220 in response to a user 230, 232 seeking insights into that raw data 220.

In illustration, assume that there is an unstructured narrative statement in raw data 220 that reads "Martin Goodman stayed in the Full Moon hotel during May 2-3, 2020." Question/answer generator 262 can generate, for example, the following questions pertaining to that unstructured data:

"Who stayed in the Full Moon Hotel during May 2-3, 2020?"

"Where did Martin Goodman stay during May 2-3, 2020?"

"When did Martin Goodman stay in Full Moon Hotel?"

These questions can be useful to users 230, 232 authorized to access exact values in raw data 220, which are indicated in the questions.

Question/answer generator 262 also can generate some questions that obfuscate the precise values of an attribute associated with a question (e.g., a patient's name, a hotel's name, etc.):

"Which hotel had one of our patients checked in during May 2-3, 2020?"

"When did Full Moon hotel have one of our patients checked in?"

"In which city did Martin Goodman stay during May 2-3, 2020?"

"Did Martin Goodman stay at a hotel during May 2-3, 2020?"

"On May 2-3, 2020, did Martin Goodman stay at a location where others of our patients stated?"

These questions can be useful for users 230, 232 who are not authorized to access certain precise values in raw data 220, but are authorized to access broader data where some values are generalized to a category or a containing class (e.g., a city in which a particular hotel is located).

Question/answer generator 262 also can generate answers to questions presented to users. Users 230, 232 having certain roles may be allowed only to ask only the Who, Where, When, Which, etc., types of questions and obtain the respective answers. Credential manager 214 can share those questions/answers (Q/A) 290 with users 230, 232 authorized to access the respective answers.

Further, question/answer generator 262 can implement semantic embedding vectors, which can be used to provide answers to proximity-oriented questions. The semantic embedding vectors can be generated using a large language model (LLM) that preserves semantic proximity between values. In illustration, question/answer generator 262 can create a set of similarly-oriented questions. Answers to the similarly-oriented question can be determined by comparing, using semantic vectors and a similarity metric (e.g., cosine similarity), query records in raw data 220 with a query on sensitive attributes contained in those records. For each of those similarly-oriented questions, question/answer generator 262 can create answer to the similarly-oriented question using a semantic vector and a similarity metric. Question/answer generator 262 can create a Q/A 260 for each similarly-oriented question. Each QA 290 can include the similarly-oriented question and the answer to that similarly-oriented question. Question/answer generator 262 can assign the semantic embedding vector and similarity metric used to determine the answer to each respective Q/A 260.

User 230 can ask for records, similar to a certain query record that the user 230 provides, according to a sensitive attribute. If user 230 is not authorized to access attribute values and/or parameters contained in raw data 220 in the requested records, those values and/or parameters will not be presented to the user. Instead, obfuscated data including alternative representations of the raw data can be presented to user 230.

By way of example, assume user 230 submits a data request to credential manager 214, for example by submitting a query record. In response, based on the role and/or data access authorization level assigned to user 230, credential manager can determine whether the data request is too broad, meaning that the data request requests data, for example raw data 220 and/or obfuscated data 224, user 230 is not authorized to access. In response to credential manager 214 determining that the data request is too broad, credential manager 214 can provide a list of similarly-oriented questions. As noted, similarly-oriented are questions similar in scope to the original data request, but configured to request data, including obfuscated data 224, which the user is authorized to access. User 230 can select one or more of the similarly-oriented questions. In response, credential manager 214 can present to user 230 data requested by the selected similarly-oriented question(s).

In illustration, assume user 230 asks "where did Martin Goodman stay during May 2-3, 2020?" Also, assume that user 230 is not authorized to access raw data 220 indicating the exact hotel where Martin Goodman stayed, but is authorized to access other data pertaining to Martin Goodman's location on the specified dates. Thus, in response to that query record, credential manager 214 can present to user 230 the following similarly-oriented questions requesting obfuscated data:

"Which hotel is similar to the one Martin Goodman stayed in during May 2-3, 2020?"
"Did Martin Goodman stay at a place like Sunset Hotel during May 2-3, 2020?"
"On May 2-3, 2020, did Martin Goodman stay at a location close to where others of our patients stayed?"

Those questions can serve to guide user 230 to explore a data set in raw data 220 by submitting query records to access data that user 230 is authorized to access. These questions can refer to an entity similar to an entity contained in raw data 220, without disclosing the exact entity name contained in raw data 220, thus obfuscating that exact entity name so as not to be disclosed user 230. User 230 can select one or more questions from the list and, in response, credential manager 214 can process each selected question as a query record and provide the corresponding answer to user 230, while withholding from user 230, and thus keeping confidential, raw data 220 that user 230 is not authorized to access. In this regard, the answers provided by credential manager 214 can include obfuscated data 224 (e.g., a city name instead of a specific hotel name) rather than a masked list of data, much of which may be irrelevant to user 230. Accordingly, data protection system 200 can provide to user 230 insights into raw data 220, without disclosing private information user 230 is not authorized to access.

FIG. 3 is a flowchart illustrating an example of a method 300 of masking sensitive information in raw data. Method 300 can be implemented by data protection system 200 of FIGS. 1 and 2.

At step 302 data protection system 200 can generate obfuscated data comprising a plurality of alternative representations of raw data, wherein the raw data is stored in a secure data vault.

At step 304 data protection system 200 can assign at least one user, or at least one group of users, to each of at least a portion of the plurality of alternative representations of the raw data.

At step 306 data protection system 200 can, responsive to a user authenticating with a credential manager, determine a permission level of the user.

At step 308 data protection system 200 can, responsive to the user submitting a data request, determine whether the data request requests raw data the user is not authorized to access.

At step 310 data protection system 200 can, responsive to determining that the data request requests raw data the user is not authorized to access, present to the user at least a portion of the obfuscated data the user is authorized to access, the portion of the obfuscated data comprising at least one plurality of alternative representations of the raw data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Several definitions that apply throughout this document will now be presented.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "user" means a person (i.e., a human being).

What is claimed is:

1. A method, comprising:
generating, using a processor, obfuscated data comprising a plurality of alternative representations of raw data, wherein the raw data is stored in a secure data vault;
assigning at least one user, or at least one group of users, to each of at least a portion of the plurality of alternative representations of the raw data;
responsive to a user authenticating with a credential manager, determining a permission level of the user;
responsive to the user submitting a data request, determining whether the data request requests raw data the user is not authorized to access;
responsive to determining that the data request requests raw data the user is not authorized to access, determining a plurality of similarly-oriented questions, each of the plurality of similarly-oriented questions being similar in scope to the data request, but configured to request obfuscated data the user is authorized to access; and
presenting to the user at least a portion of the obfuscated data the user is authorized to access, the portion of the obfuscated data comprising at least one plurality of alternative representations of the raw data, wherein the obfuscated data provides at least one answer to at least one of the plurality of similarly-oriented questions.

2. The method of claim 1, further comprising:
presenting to the user the plurality of similarly-oriented questions;
wherein presenting to the user at least the portion of the obfuscated data the user is authorized to access comprises, responsive to the user selecting the at least one of the plurality of similarly-oriented questions, presenting to the user the obfuscated data.

3. The method of claim 2, further comprising:
generating the plurality of similarly-oriented questions;
for a similarly-oriented question, of the plurality of similarly-oriented questions, generating an answer to the similarly-oriented question; and
for the similarly-oriented question, creating a question/answer pair comprising the similarly-oriented question and the answer to the similarly-oriented question.

4. The method of claim 3, further comprising:
assigning to the question/answer pair a semantic embedding vector used to determine the answer to the similarly-oriented question in the question/answer pair.

5. The method of claim 4, further comprising:
generating the semantic embedding vector using a large language model that preserves semantic proximity between values.

6. The method of claim 3, wherein the generating the plurality of similarly-oriented questions comprises:
identifying sensitive attributes in the raw data; and
creating the plurality of similarly-oriented questions and respective answers based on the sensitive attributes in the raw data.

7. The method of claim 1, wherein the alternative representations of the raw data comprise synthetic values or synthetic parameters that are analogous to, but different than, values or parameters contained in the raw data.

8. A system, comprising:
a processor programmed to initiate executable operations comprising:
generating obfuscated data comprising a plurality of alternative representations of raw data, wherein the raw data is stored in a secure data vault;
assigning at least one user, or at least one group of users, to each of at least a portion of the plurality of alternative representations of the raw data;
responsive to a user authenticating with a credential manager, determining a permission level of the user;
responsive to the user submitting a data request, determining whether the data request requests raw data the user is not authorized to access;
responsive to determining that the data request requests raw data the user is not authorized to access, determining a plurality of similarly-oriented questions, each of the plurality of similarly-oriented questions being similar in scope to the data request, but configured to request obfuscated data the user is authorized to access; and
presenting to the user at least a portion of the obfuscated data the user is authorized to access, the portion of the obfuscated data comprising at least one plurality of alternative representations of the raw data, wherein the obfuscated data provides at least one answer to the at least one of the plurality of similarly-oriented questions.

9. The system of claim 8, the executable operations further comprising:
presenting to the user the plurality of similarly-oriented questions;
wherein presenting to the user at least the portion of the obfuscated data the user is authorized to access comprises, responsive to the user selecting at least one of the plurality of similarly-oriented questions, presenting to the user the obfuscated data.

10. The system of claim 9, the executable operations further comprising:
generating the plurality of similarly-oriented questions;
for a similarly-oriented question, of the plurality of similarly-oriented questions, generating an answer to the similarly-oriented question; and for the similarly-oriented question, creating a question/ answer pair comprising the similarly-oriented question and the answer to the similarly-oriented question.

11. The system of claim 10, the executable operations further comprising:

assigning to the question/answer pair a semantic embedding vector used to determine the answer to the similarly-oriented question in the question/answer pair.

12. The system of claim 11, the executable operations further comprising:

generating the semantic embedding vector using a large language model that preserves semantic proximity between values.

13. The system of claim 10, wherein the generating the plurality of similarly-oriented questions comprises:

identifying sensitive attributes in the raw data; and creating the plurality of similarly-oriented questions and respective answers based on the sensitive attributes in the raw data.

14. The system of claim 8, wherein the alternative representations of the raw data comprise synthetic values or synthetic parameters that are analogous to, but different than, values or parameters contained in the raw data.

15. A computer program product, comprising:

one or more computer readable storage mediums having program code stored thereon, the program code stored on the one or more computer readable storage mediums collectively executable by a data processing system to initiate operations including:

generating obfuscated data comprising a plurality of alternative representations of raw data, wherein the raw data is stored in a secure data vault;

assigning at least one user, or at least one group of users, to each of at least a portion of the plurality of alternative representations of the raw data;

responsive to a user authenticating with a credential manager, determining a permission level of the user;

responsive to the user submitting a data request, determining whether the data request requests raw data the user is not authorized to access;

responsive to determining that the data request requests raw data the user is not authorized to access, determining a plurality of similarly-oriented questions, each of the plurality of similarly-oriented questions being similar in scope to the data request, but configured to request obfuscated data the user is authorized to access; and presenting to the user at least a portion of the obfuscated data the user is authorized to access, the portion of the obfuscated data comprising at least one plurality of alternative representations of the raw data, wherein the obfuscated data provides at least one answer to the at least one of the plurality of similarly-oriented questions.

16. The computer program product of claim 15, wherein the program code is executable by the data processing system to initiate operations further comprises:

presenting to the user the plurality of similarly-oriented questions;

wherein presenting to the user at least the portion of the obfuscated data the user is authorized to access comprises, responsive to the user selecting at least one of the plurality of similarly-oriented questions, presenting to the user the obfuscated data.

17. The computer program product of claim 16, wherein the program code is executable by the data processing system to initiate operations further comprising:

generating the plurality of similarly-oriented questions;

for a similarly-oriented question, of the plurality of similarly-oriented questions, generating an answer to the similarly-oriented question; and for the similarly-oriented question, creating a question/ answer pair comprising the similarly-oriented question and the answer to the similarly-oriented question.

18. The computer program product of claim 17, wherein the program code is executable by the data processing system to initiate operations further comprising:

assigning to the question/answer pair a semantic embedding vector used to determine the answer to the similarly-oriented question in the question/answer pair.

19. The computer program product of claim 18, wherein the program code is executable by the data processing system to initiate operations further comprising:

generating the semantic embedding vector using a large language model that preserves semantic proximity between values.

20. The computer program product of claim 17, wherein the generating the plurality of similarly-oriented questions comprises:

identifying sensitive attributes in the raw data; and creating the plurality of similarly-oriented questions and respective answers based on the sensitive attributes in the raw data.

* * * * *